US011500999B2

(12) United States Patent
Spisak et al.

(10) Patent No.: US 11,500,999 B2
(45) Date of Patent: Nov. 15, 2022

(54) TESTING SIMULATION SEQUENCE USING INDUSTRY SPECIFIC PARAMETERS

(71) Applicant: International Business Machines Corporation, Armonk, NY (US)

(72) Inventors: Michael J. Spisak, East Northport, NY (US); Colin Richard Davis, Clifford Township, PA (US); Carter Garrison, Atlanta, GA (US); Jonathan Sams, Atlanta, GA (US); Ibukunoluwa I. Oladunjoye, Bowie, MD (US); Tristian Pittman, Atlanta, GA (US); Christopher A. Peterson, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 16/724,080

(22) Filed: Dec. 20, 2019

(65) Prior Publication Data

US 2021/0192053 A1    Jun. 24, 2021

(51) Int. Cl.
*G06F 21/57* (2013.01)
*G06N 5/04* (2006.01)
*G06N 20/20* (2019.01)
*G06N 20/00* (2019.01)

(52) U.S. Cl.
CPC .............. *G06F 21/577* (2013.01); *G06N 5/04* (2013.01); *G06N 20/00* (2019.01); *G06F 2221/034* (2013.01)

(58) Field of Classification Search
CPC .. G06F 21/577; G06F 2221/034; G06F 21/57; G06N 5/04; G06N 20/00; G06N 5/003; G06N 20/20
See application file for complete search history.

(56) References Cited

U.S. PATENT DOCUMENTS

| 7,155,158 | B1 | 12/2006 | Iuppa et al. | |
|---|---|---|---|---|
| 10,079,850 | B1 | 9/2018 | Patil et al. | |
| 2003/0182582 | A1 | 9/2003 | Park et al. | |
| 2012/0123758 | A1 | 5/2012 | Kevan | |
| 2013/0198847 | A1 | 8/2013 | Sampigethaya | |
| 2013/0227697 | A1 | 8/2013 | Zandani | |
| 2014/0330618 | A1* | 11/2014 | Wong .................. | G06Q 30/0203 705/7.32 |
| 2016/0028758 | A1 | 1/2016 | Ellis | |
| 2016/0285907 | A1 | 9/2016 | Nguyen et al. | |
| 2019/0005428 | A1* | 1/2019 | Kras ................ | G06Q 10/06314 |
| 2021/0019528 | A1* | 1/2021 | Ghadyali .............. | G06T 7/0004 |

* cited by examiner

*Primary Examiner* — Quazi Farooqui
(74) *Attorney, Agent, or Firm* — VanLeeuwen & VanLeeuwen; Jeffrey S. LaBaw

(57) ABSTRACT

An approach is provided that retrieves organization information that pertains to a computer system operated by an organization and a set of current cyber security threat data that pertains to the organization. A security simulation is generated based on the current cyber security threat data and the organization data with the simulation including any number of decision-linked simulation segments. The simulation is then performed during which a user makes decisions based on the decision-linked simulation segments. The result of the simulation is an evaluated cyber security threat that corresponds to the organization's computer system.

20 Claims, 8 Drawing Sheets

TESTING SIMULATION SEQUENCE USING INDUSTRY SPECIFIC PARAMETERS

BACKGROUND

A data breach is the intentional or unintentional release of private or confidential information to an unauthorized party. Data breaches might result from concerted attacks by hackers or other malevolent individuals for personal or other type of gain. Data breaches are often associated with organized crime and political activists or national governments. Data breaches can often result from careless disposal of used computer equipment or data storage media. Data breaches may involve financial information such as credit card or bank details, personal health information (PHI), Personally identifiable information (PII), trade secrets of corporations or intellectual property. Data breaches often involve overexposed and vulnerable unstructured data such as computer files, documents, and other sensitive information.

To combat data breaches, organizations can employ authorized testing, or simulation, of computer systems. Some of these tests are referred to as "penetration tests" as they test the possible weakness of computer systems that may be attacked, or penetrated, by unauthorized individuals seeking to illegally access the organization's sensitive data. Traditional simulations are often large, expensive, non-portable systems that are designed for large well-funded organizations. These challenges leave smaller organizations with smaller security budgets less secure and more prone to data breaches as the traditional penetration tests are not quickly and automatically altered based on such smaller organization's needs.

SUMMARY

An approach is provided that retrieves organization information that pertains to a computer system operated by an organization and a set of current cyber security threat data that pertains to the organization. A security simulation is generated based on the current cyber security threat data and the organization data with the simulation including any number of decision-linked simulation segments. The simulation is then performed during which a user makes decisions based on the decision-linked simulation segments. The result of the simulation is an evaluated cyber security threat that corresponds to the organization's computer system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
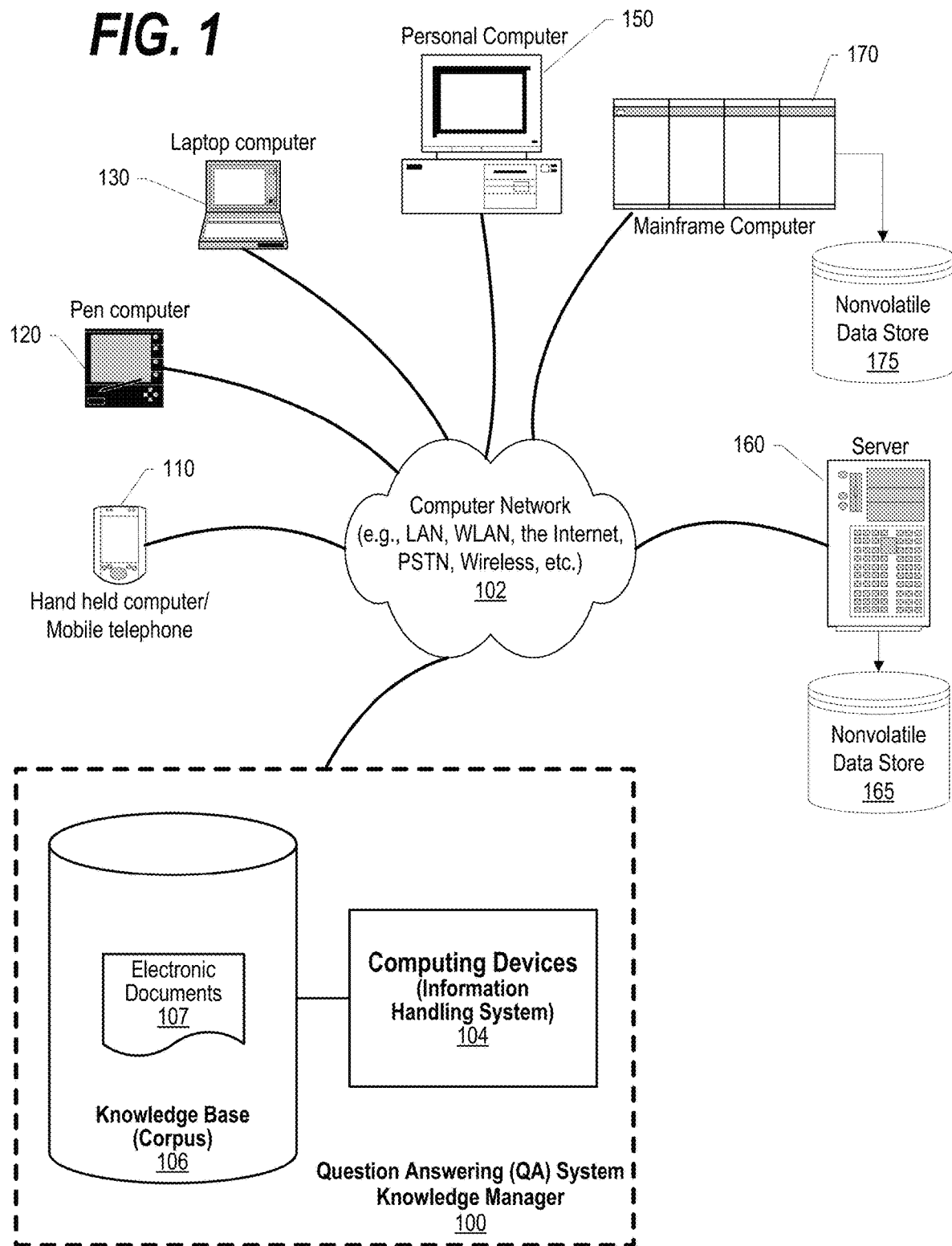
FIG. 1 depicts a network environment that includes a knowledge manager that utilizes a knowledge base.

FIGS. 1-8 describe an approach that creates dynamic simulations that assist users with cyber security incident response testing. The approach utilizes organizational data along with current cyber security threat data to generate simulations and learns from changes in both the organization as well as changes in cyber security threats. To identify industry specific situations that might apply to the business being simulated as well as current cyber threats being encountered by an industry, such as financial institutions, etc., one embodiment uses Artificial Intelligence (AI) that is trained regarding industry and threat data to better generate the simulation.

In one example embodiment of an AI system, a question-answering (QA) system is used as a type of AI system that learns about the industry and threats. The approach takes user organization data and identifies security threats that appear to be prevalent in the organization's industry and the organization's specific business. Once the approach gathers the needed information, it generates dynamically simulated simulations that include any number of simulation segments. These simulation segments are woven together in a decision tree to create a comprehensive testing simulation sequence that uses industry specific parameters. The generated simulation may be performed by a user of the organization.

During performance of the generated simulation, the user is asked to make one or more decision in response to a presented simulation segment. The decisions made by the user are used to identify and present other simulation segments that are "branches" from the current simulation segment. The user continues to respond to presented simulation segments until an end point of the overall simulation is reached. While traversing the simulation, the system keeps track of the route that the user has taken including the various simulation segments presented to the user and the responses (decisions) that the user made with respect to each simulation segment leading to the end of the simulation. The route that the user takes through the simulation represents an evaluated cyber security threat that corresponds to the organization's computer system since the simulation segments and possible routes were generated based on the organization's system and the current cyber security threats identified in the applicable industry, or field.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter simulation segment, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
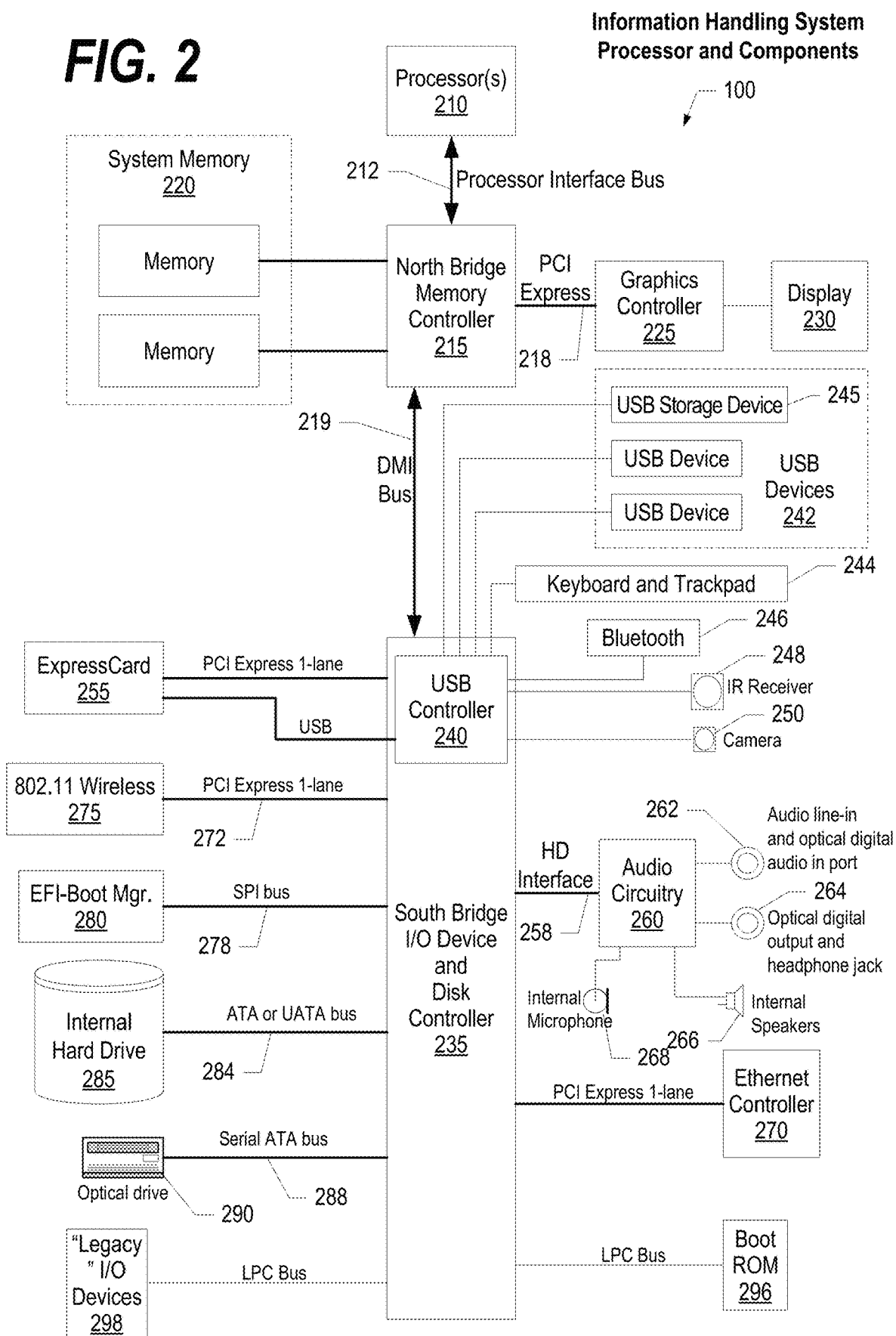
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
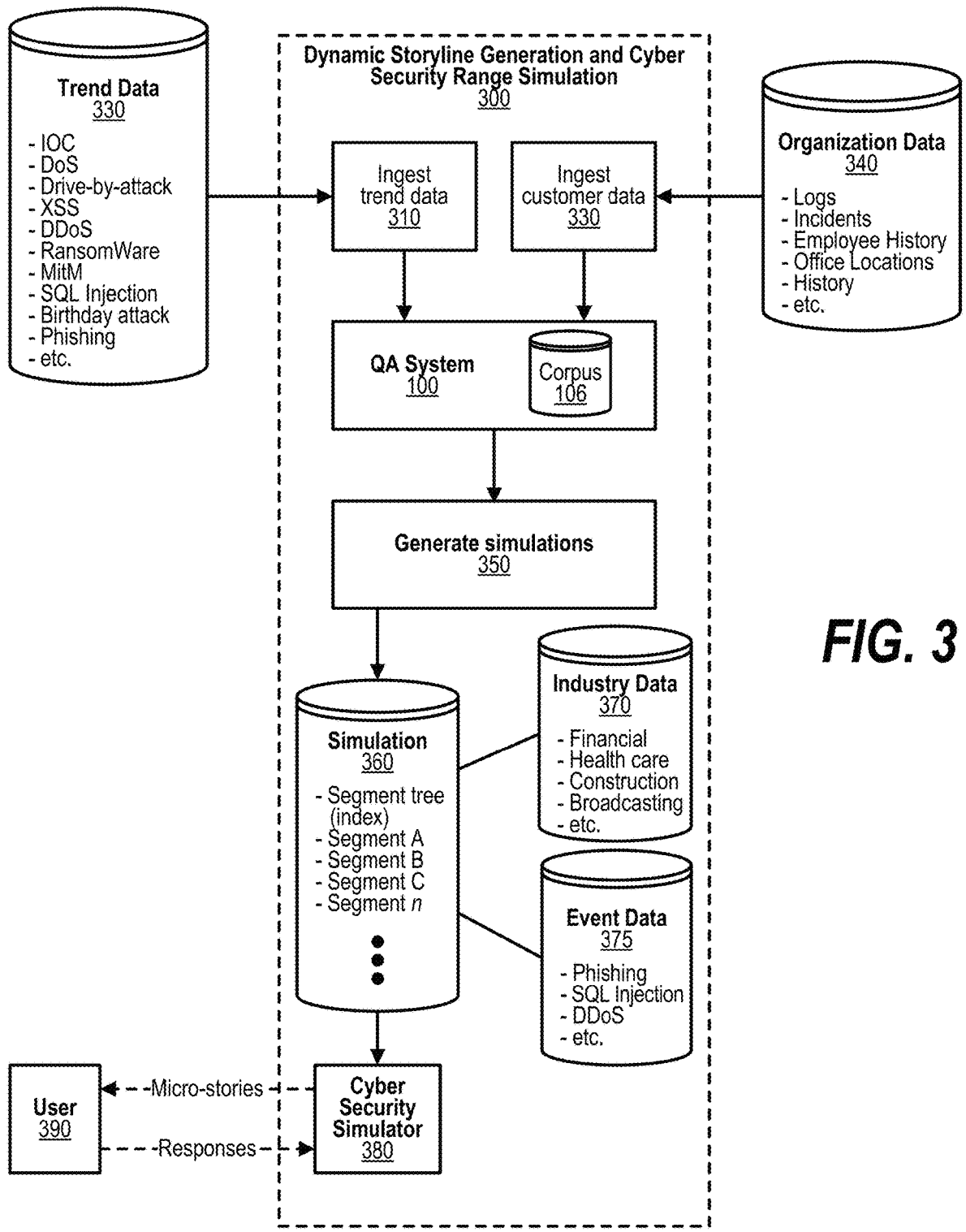
FIG. 3 is a component diagram that shows the various components included in a system that performs a dynamic simulation generation and cyber security range simulation.

FIG. 3 is a component diagram that shows the various components included in a system that performs a dynamic simulation generation and cyber security range simulation. Dynamic simulation generation and cyber security range simulation system 300 retrieves cyber security trend data, represented by data store 330, and organization data 340 corresponding to the organization that is utilizing the cyber security simulation. The cyber security trend data is a set of current cyber security threat data that pertains to the organization. The organization might be in a particular industry, such as financial services, etc., and the current cyber security threat data reflects the cyber security threats that are currently prevalent in the organization's industry. For example, if the cyber security threat data indicates that the organization's industry area (e.g., financial services, etc.) is currently experiencing high levels of "denial of service" (DoS) attacks, then the trend data would indicate this prevalence as well as any other cyber security threat data that might pertain to the organization.

The organization data includes information about the organization including past cyber security logs and incidents. In addition, employee history data, office locations, and other historical data can be included in the organizational data. In addition, any data specific to the organization's computer system infrastructure can also be included in data store 340.

System 300 ingests the current cyber security threat data using process 310 with the data, in one embodiment, being ingested into corpus 106 utilized by question-answering (QA) system 100. Process 350 generates cyber security simulations pertaining to the organization and these simulations are stored in data store 360. As shown, the simulations include any number of "micro-stories" that are decision-linked simulation segments. The simulation relates to the organization's industry data as represented by data store 370, such as financial services, health care, construction, broadcasting, telecom, etc. The simulation is also associated with various cyber security event data represented by data store 375 with the cyber security event data being different cyber security events that are encountered during the cyber security simulation. For example, the cyber security event data could include a "phishing" security event in one of the simulation segments (shown as "micro-stories"), and an SQL injection attack into a different one of the simulation segments. The number and type of cyber security events is determined by the organization's industry type as well as the current cyber security threat data that is being experienced by the organization's industry type.

Cyber security simulator process 380 runs the generated cyber security simulation where various simulation segments included in the simulation are presented to one of the organization's users (user 390), such as a systems security administrator. The user provides responses to the presented simulation segment with these responses determining the next simulation segment within the simulation that is selected and presented to the user. The presentation of these decision-linked simulation segments and the user's responses to the presented simulation segments continues until a simulation segment is encountered that does not branch to another simulation segment given the user's response. At this point the simulation is complete and the data gathered during the simulation is evaluated to form an evaluated cyber security threat that corresponds to the organization's computer system. This evaluated cyber security threat may indicate shortcomings or other issues with the organization's cyber security so that corrective measures can be employed to better protect the organization's assets from hackers and other malevolent users.

Figure 4:
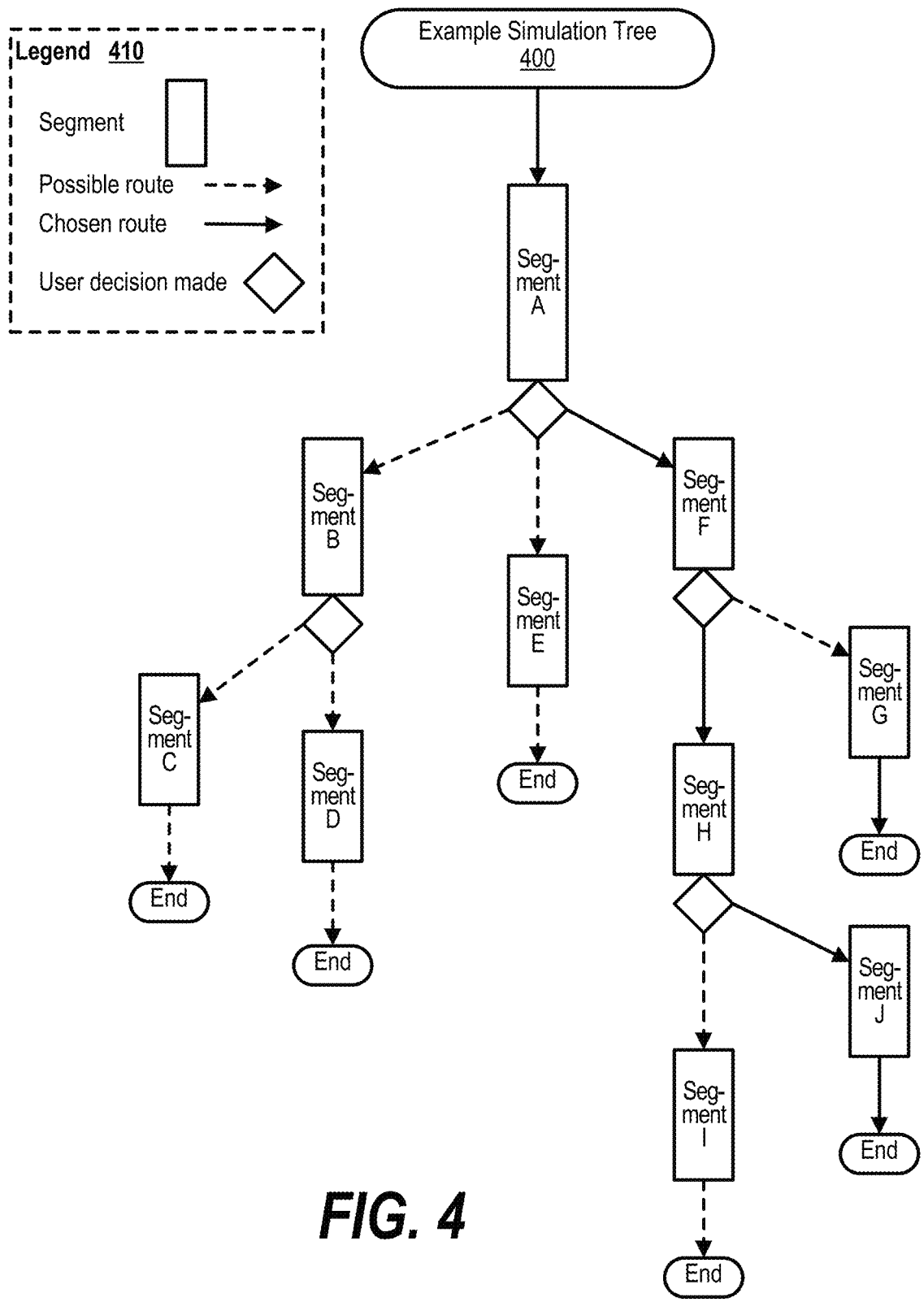
FIG. 4 is a depiction of a simulation tree example that can be generated by the system that generates a dynamic simulation.

FIG. 4 is a depiction of a simulation segment tree example that can be generated by the system that generates a dynamic simulation. The example begins at 400 where an initial simulation segment A is presented to the user. Legend 410 depicts that the various simulation segments that form the simulation are noted as rectangles, decisions made by the user are noted as diamond boxes, possible (untaken) routes are noted as dashed lines, and taken routes are noted as solid lines.

Simulation segment A is presented to the user, such as being displayed on a display screen where the user reads what is happening, such as a warning that network traffic to the organization has increased dramatically. In response, the simulation segment prompts the user as to how the organization would handle the situation. Simulation segments can branch to two or more different simulation segments within the simulation. For example, in response to the increased network traffic, the user may choose whether to ignore the increased traffic or perform some other action, such as throttle or block the denial of service traffic, or route traffic through a traffic-scrubbing service. Based upon which option is chosen by the user, other simulation segments (micro stories) are selected and presented to the user. While only three options are shown for simplicity from the first simulation segment A, any number of options can be available depending on the particular simulation segment.

In the example, the user's response causes the next simulation segment F to be retrieved and presented to the user. Subsequent selections from the user cause simulation segments H and J to be presented to the user, with J being a terminal simulation segment where the simulation ends.

Figure 5:
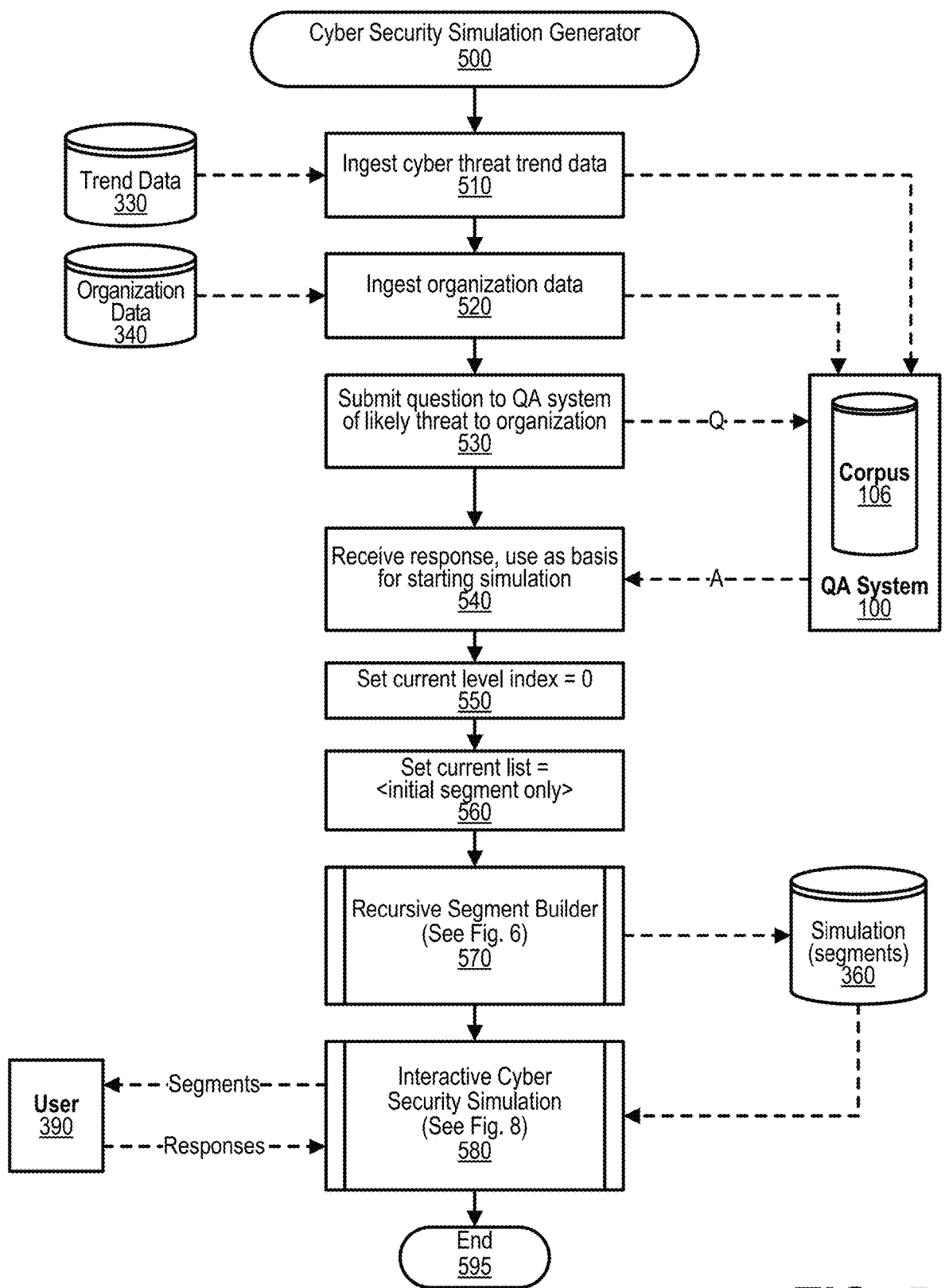
FIG. 5 is a depiction of a flowchart showing the steps taken to implement the dynamic simulation generation and cyber security range simulation system.

FIG. 5 is a depiction of a flowchart showing the steps taken to implement the dynamic simulation generation and cyber security range simulation system. FIG. 5 processing commences at 500 and shows the steps taken by a process that generates a cyber security simulation. At step 510, the process ingests cyber threat trend data from one or more current cyber threat data sources as represented by data store 330. In one embodiment, the data is ingested into corpus 106 that is utilized by QA system 100. At step 520, the process ingests organization data from one or more organizational data sources as represented by data store 340. In one embodiment, the data is ingested into corpus 106 that is utilized by QA system 100.

At step 530, the process submits a question to the, now trained, QA system 100 with the question directed at a "likely threat" to this organization given the organization's industry type and current cyber security threat data already ingested into the QA system's corpus. At step 540, the process receives an initial threat response from QA system 100 as to a likely cyber threat to the organization and this initial threat response is used as the basis for starting the initial simulation segment, shown as simulation segment A in FIG. 4.

At step 550, the process sets the current level index to zero ('0') indicating that the segment index is at the highest level in the decision tree hierarchy. At step 560, the process sets the current list to be only the initially created segment as the top level in the decision tree is the initial simulation segment, indicated by the notation of "<initial segment only>". At predefined process 570, the process performs the Recursive Segment Builder routine (see FIG. 6 and corresponding text for processing details). This routine builds the decision-linked simulation segments such as those depicted in FIG. 4. The results of this routine are stored in data store 360 and comprise the completed simulation of decision-linked simulation segments as depicted in FIG. 4.

Figure 8:
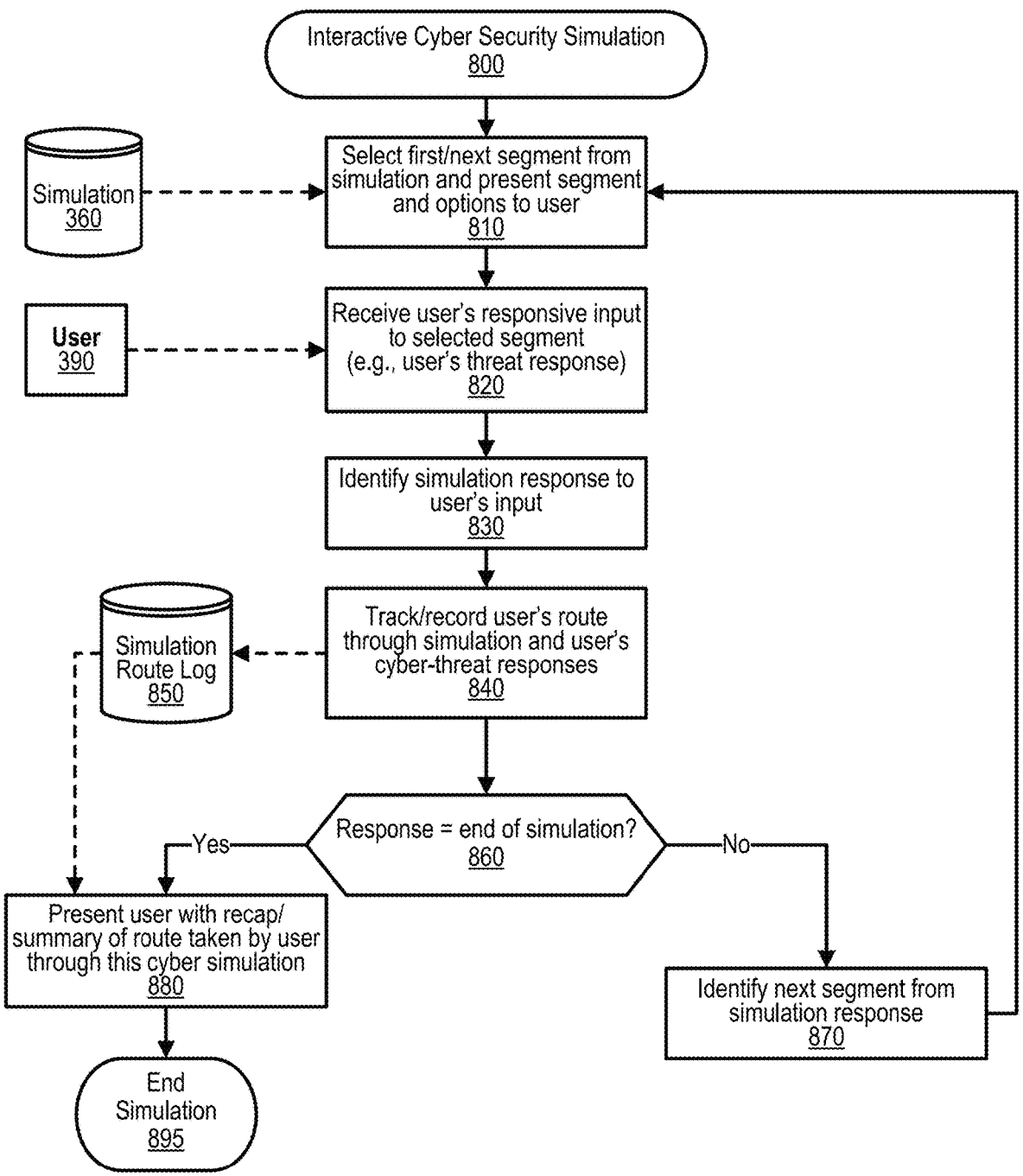
FIG. 8 is a depiction of a flowchart showing the logic used to provide an interactive cyber security simulation.

At predefined process 580, the process performs the Interactive Cyber Security Story-Based Simulation routine (see FIG. 8 and corresponding text for processing details). This routine processes the decision-linked simulation segments from data store 360 presenting individual simulation segments to user 390 and utilizing user responses to identify and present further simulation segments until an end of the simulation is reached. The routine also evaluates the cyber security threat posed to the user through the simulation so that corrective measures can be identified and implemented by the organization to minimize or eliminate the threat based on the simulation results. FIG. 5 processing thereafter ends at 595.

Figure 6:
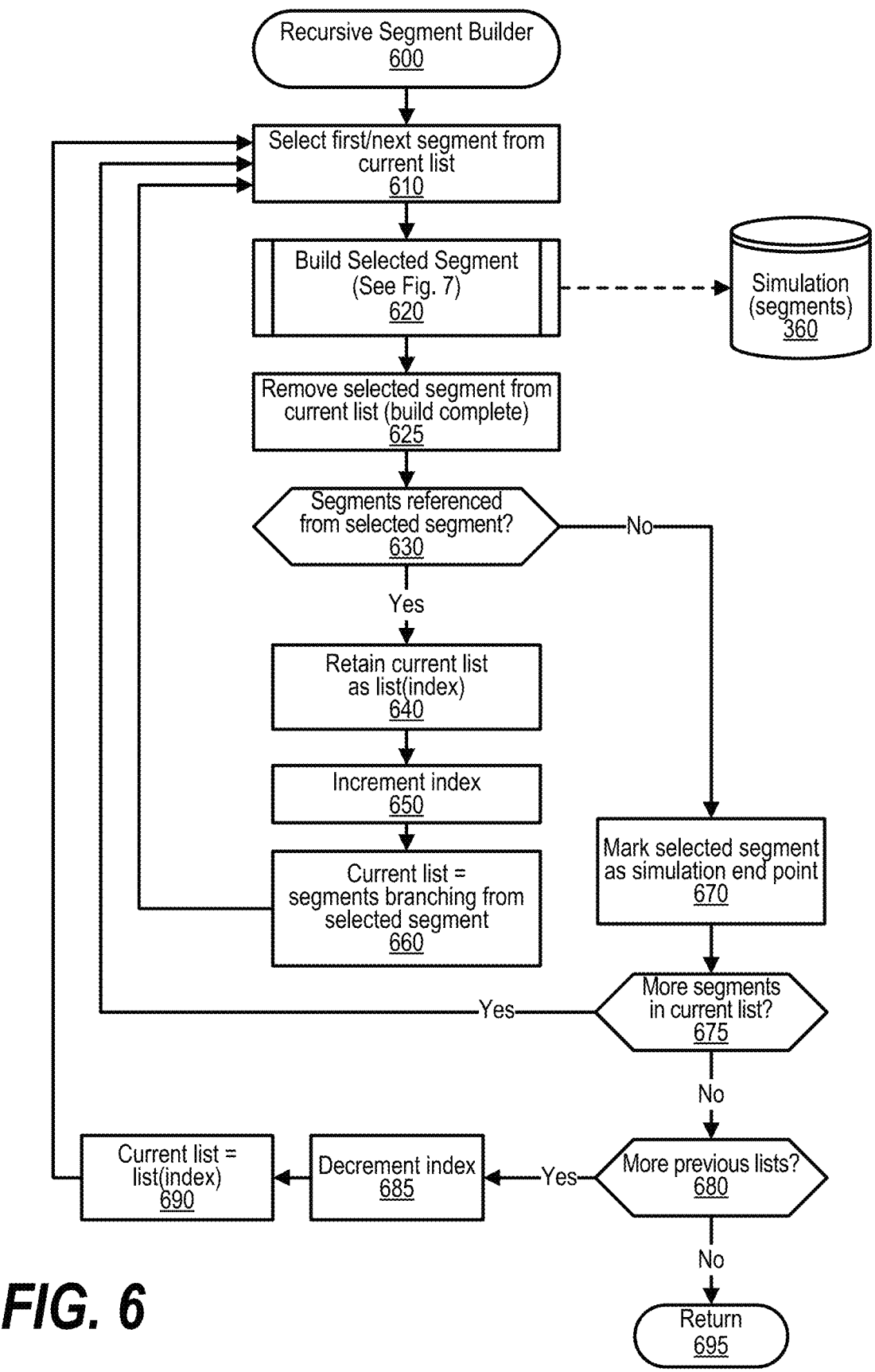
FIG. 6 is a depiction of a flowchart showing the logic used by a recursive segment builder that is utilized by the dynamic simulation generation and cyber security range simulation system.

FIG. 6 is a depiction of a flowchart showing the logic used by a recursive segment builder that is utilized by the dynamic simulation generation and cyber security range simulation system. FIG. 6 processing commences at 600 and shows the steps taken by a process that recursively builds a simulation that includes multiple decision-linked simulation segments. At step 610, the process selects the first simulation segment, or simulation segment, from the current list. This routine is called from FIG. 5 that initialized the first simulation segment (simulation segment A) with simulation segment A being the only simulation segment in the current list and also being the only simulation segment that resides in the top level (level 0).

Figure 7:
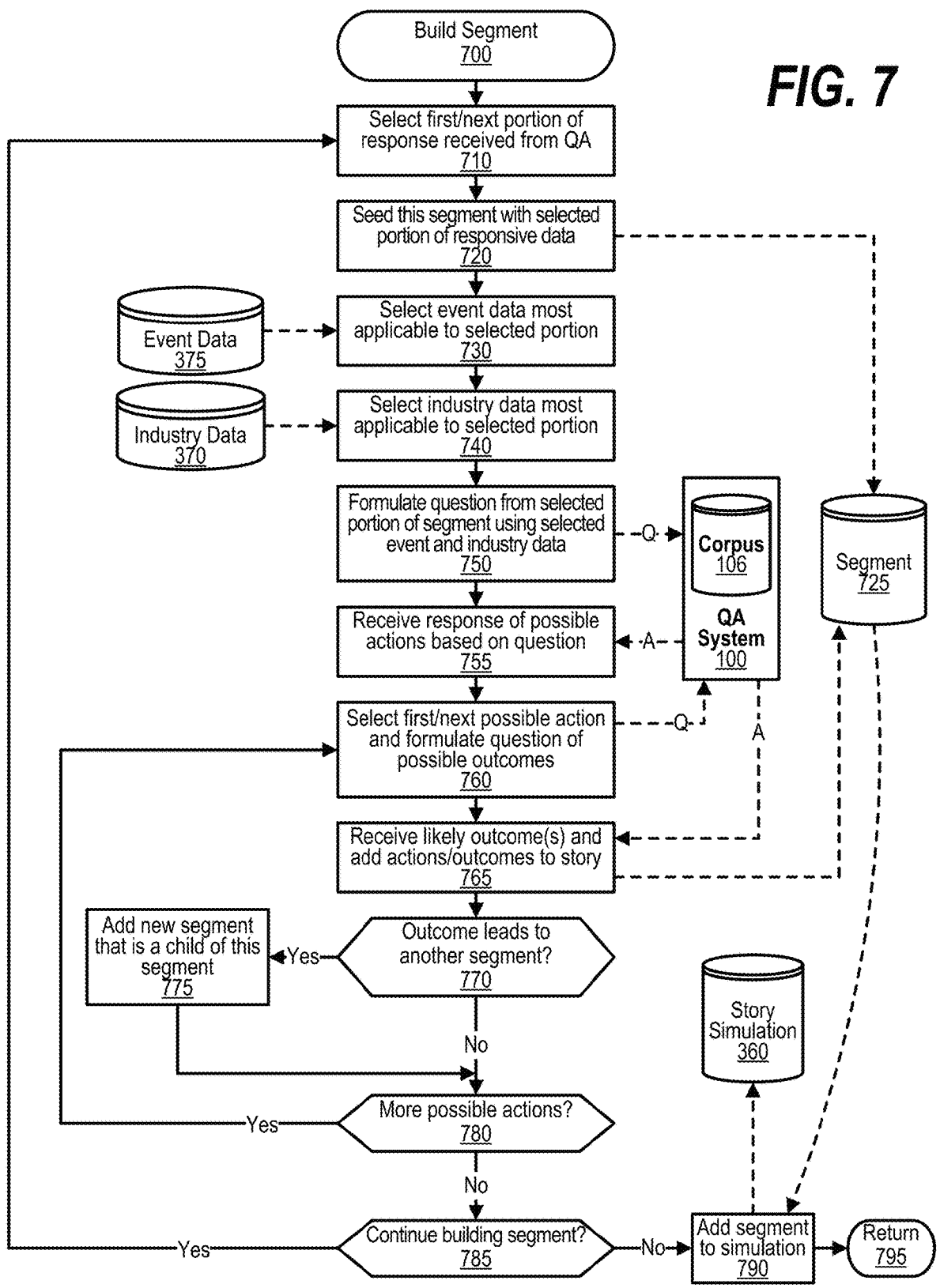
FIG. 7 is a depiction of a flowchart showing the logic used to build a simulation segment that is used by the recursive segment builder to generate the dynamic simulation.

At predefined process 620, the process performs the Build Selected Simulation segment routine (see FIG. 7 and corresponding text for processing details). As the name implies, this routine builds the actual simulation segment including any decisions that the user is asked to make as a result of reading the simulation segment. The built simulation segments are stored in data store 360. At step 625, the process removes selected simulation segment (e.g., simulation segment A) from the current list indicating that the build of this simulation segment that was referenced in the list is now complete. Reference between segments are from a parent segment to two or more child segments. If a parent segment does not reference child segments, then that parent segment is a terminal (end) segment of the simulation.

The process determines as to whether micro-stories (other simulation segments) are referenced from the selected segment (decision 630). For example, if a user is asked to decide between three possible options, each of the possible options would branch to a different simulation segment, perhaps based on a particular technology or approach that the user decided to use to address the situation described in the current simulation segment. If other simulation segments (micro-stories) are referenced from the selected simulation segment, then decision 630 branches to the 'yes' branch to perform steps 640 through 660 that set up the additional decision-linked simulation segments to add to the current simulation segment. On the other hand, if no other simulation segments branch from the selected simulation segment, then decision 630 branches to the 'no' branch whereupon, at step 670 the process marks the selected (current) simulation segment as an end point to the simulation.

Steps 640 through 660 are performed when other simulation segments are referenced as possible branches from the selected, or current, simulation segment. At step 640, the process retains the current list as list (index). At step 650, the process increments the index by the number of simulation segments referenced as possible branches from the current simulation segment. At step 660, the process adds each of the simulation segments referenced as possible branches from the current simulation segment to the current list of simulation segments that are being built by the routine.

The routine loops back to step 610 to start processing each of the simulation segments in the current list. If one of these simulation segments has other simulation segments that are referenced as further possible branches, then the process recursively processes all of the decision-linked simulation segments down an entire branch of the simulation and then returns to previous lists of simulation segments when the branch is completed. This returning to previous (earlier) lists is shown at the bottom of the flowchart where the index is decremented to an earlier current list of simulation segments in steps 685 and 690. The process determines as to whether there are more simulation segments to build in the current list (decision 675).

If there are more simulation segments to build in the current list, then decision 675 branches to the 'yes' branch which loops back to step 610 to select and process the next simulation segment in the current list as described above. This looping continues until all of the simulation segments in the current list have been processed, at which point decision 675 branches to the 'no' branch exiting the loop. This looping builds sequences of segments, an example of which is shown in FIG. 4. A segment can either be a terminal (end) segment where the simulation ends, or a segment can be a parent segment of two or more child segments. The determination of which child segment the simulation branches from a parent segment is based on the response that is received from the user.

The process determines as to whether there are more previous lists to process (decision 680). Previous lists are lists of other simulation segments previously identified by other simulation segments that were built earlier in the simulation. If there are more previous lists to process, then decision 680 branches to the 'yes' branch to perform steps 685 and 690 before looping back to step 610 to continue processing a previous list of simulation segments. At step 685, the process decrements the index and at step 690, the process sets the currents list to be the list referenced by the decremented index. This looping continues until there are no more previous lists of simulation segments to build indicating that all of the simulation segments have been built, at which point decision 680 branches to the 'no' branch exiting the loop and processing ends at 695.

FIG. 7 is a depiction of a flowchart showing the logic used to build a simulation segment that is used by the recursive segment builder to generate the dynamic story. FIG. 7 processing commences at 700 and shows the steps taken by a process that builds a simulation segment, or simulation segment, as part of a cyber security simulation. At step 710, the process selects the first portion of a response that was previously received from QA system 100 that relates to a question posed to the QA system regarding a cyber security event and the organization's industry type. At step 720, the process seeds this simulation segment that is currently being built with the selected portion of the responsive data from the QA system. This seeding initializes the current simulation segment text that is stored in data store 725.

At step 730, the process selects cyber security current event data that is most applicable to the selected portion. The cyber security event data is depicted as being retrieved from data store 375 but might be retrieved from the QA system's corpus if such data has already been ingested. At step 740, the process selects industry data most applicable to selected portion. The industry data is depicted as being retrieved from data store 370 but might be retrieved from the QA system's corpus if such data has already been ingested.

At step 750, the process formulates a question from the selected portion of the simulation segment using both the selected current cyber security event data and the selected industry data in the formulation. This question is submitted to QA system 100. At step 755, the process receives a response, or answer(s), from QA system 100 of possible actions that are based on the question posed to the QA system.

At step 760, the process selects the first possible action and formulates a question of possible outcomes to the QA system. At step 765, the process receives likely outcome(s) as answers from the QA system and adds such actions and outcomes to the simulation. These likely outcomes are added to the current simulation segment text that is stored in data store 725.

The process determines as to whether the outcome received at step 765 leads to another simulation segment (decision 770). If the outcome leads to another simulation segment, then decision 770 branches to the 'yes' branch whereupon, at step 775, the process adds a new simulation segment that references this simulation segment with the new simulation segment being a possible branch from the current simulation segment in the decision-linked tree of simulation segments such as shown in FIG. 4. On the other hand, if the outcome does not lead to another simulation segment, then decision 770 branches to the 'no' branch without adding a new simulation segment.

The process determines as to whether there are more possible actions from the current simulation segment that need to be processed as shown above (decision 780). If there are more possible actions, then decision 780 branches to the 'yes' branch which loops back to step 760 to select the action and receive likely outcomes to the action. This looping continues until there are no more possible actions included in the current simulation segment, at which point decision 780 branches to the 'no' branch exiting the loop.

The process determines whether to continue building the current simulation segment using other portions of the response received from the QA system (decision 785). If the decision is to continue building the current simulation segment, then decision 785 branches to the 'yes' branch which loops back to step 710 to select and process the next portion of the response received from the QA system as described above. This looping continues until no further building of the current simulation segment is needed, at which point decision 785 branches to the 'no' branch exiting the loop.

At step 790, the process adds the current simulation segment stored in data store 725 to the overall cyber security simulation that is stored in data store 360. FIG. 7 processing thereafter returns to the calling routine (see FIG. 6) at 795.

FIG. 8 is a depiction of a flowchart showing the logic used to provide an interactive cyber security story-based simulation. FIG. 8 processing commences at 800 and shows the steps taken by a process that interactively performs a cyber security story-based simulation with a user. At step 810, the process selects the first decision-linked simulation segment (simulation segment) from the simulation stored in data store 360 and presents the selected simulation segment and available options (decisions) to user 390.

At step 820, the process receives the user's responsive input to the selected simulation segment, such as how the user would respond to a hypothetical cyber security threat posed in the simulation segment. At step 830, the process identifies the simulation response to the user's input. At step 840, the process tracks, or records, the user's route through the simulation and the user's cyber-threat responses to questions included in the decision-linked simulation segments. This simulation route log is stored in data store 850. The process determines as to whether the user's response has lead to an end of the simulation (decision 860).

If the user's response has lead to an end of the simulation, then decision 860 branches to the 'yes' branch whereupon, at step 880, the user is presented with an evaluated cyber security threat based on the route the user took through the simulation and processing ends at 895. On the other hand, if the user's response has not lead to an end of the simulation but instead has lead to another simulation segment, then decision 860 branches to the 'no' branch for further processing.

At step 870, the process identifies the next simulation segment, or simulation segment, from the simulation based on the user's last response. Processing then loops back to select the identified simulation segment from data store 360 and processes it as described above. This looping continues until and end of the simulation is reached with processing ending at 895.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   retrieving a set of organization information that pertains to a computer system operated by an organization;
   retrieving a set of current cyber security threat data that pertains to the organization;
   generating a security simulation based on the current cyber security threat data and the organization data, wherein the simulation comprises a plurality of decision-linked simulation segments;
   performing the simulation in which a user makes a plurality of decisions based on the plurality of decision-linked simulation segments, the performing comprising:
      executing a subset of the decision-linked simulation segments, the subset determined by the plurality of decisions made by the user, wherein the plurality of decisions results in an evaluated cyber security threat corresponding to the organization's computer system; and
      retaining a route of the user through the simulation, the route including an identification of the executed subset of the decision-linked simulation segments.

2. The method of claim 1 further comprising:
   gathering the set of current cyber security threat data from a plurality of sources of industry cyber security threats that pertain to an industry that corresponds to the organization.

3. The method of claim 1 further comprising: using the retained route in the evaluated cyber security threat.

4. The method of claim 1 further comprising:
   ingesting the set of organization information and the set of current cyber security threat data into a corpus of a question answering (QA) system;
   presenting an initial decision-linked simulation segment to the user;
   receiving a first of the plurality of decisions from the user based on the initial decision-linked simulation segment;
   identifying and presenting a second decision-linked simulation segment from the plurality of simulation segments based on the first decision received from the user; and
   repeating the receiving, identifying, and presenting of decision-linked simulation segments until an end of simulation is reached.

5. The method of claim 4 further comprising:
   providing the evaluated cyber security threat to the user, wherein the evaluated cyber security threat includes the retained route that the user took through the simulation.

6. The method of claim 1 further comprising:
   ingesting the set of organization information and the set of current cyber security threat data into a corpus of a question answering (QA) system;
   presenting an initial decision-linked simulation segment to the user;
   submitting a plurality of questions to the QA system, wherein each of the questions pertains to a likelihood of cyber threats to the organization based on the ingested organization information and ingested set of current cyber security threat data;
   receiving a set of answers from the QA system responsive to the submitted questions; and
   generating the plurality of decision-linked simulation segments based on the set of answers received from the QA system.

7. The method of claim 6 wherein a set of the plurality of questions are formulated based on a previous simulation segment corresponding to each of the respective questions included in the set of questions.

8. An information handling system comprising:
one or more processors;
a memory coupled to at least one of the processors; and
a set of computer program instructions stored in the memory and executed by at least one of the processors in order to perform actions comprising:
retrieving a set of organization information that pertains to a computer system operated by an organization;
retrieving a set of current cyber security threat data that pertains to the organization;
generating a security simulation based on the current cyber security threat data and the organization data, wherein the simulation comprises a plurality of decision-linked simulation segments;
performing the simulation in which a user makes a plurality of decisions based on the plurality of decision-linked simulation segments, the performing comprising:
executing a subset of the decision-linked simulation segments, the subset determined by the plurality of decisions made by the user, wherein the plurality of decisions results in an evaluated cyber security threat corresponding to the organization's computer system; and
retaining a route of the user through the simulation, the route including an identification of the executed subset of the decision-linked simulation segments.

9. The method information handling system of claim 8 wherein the actions further comprise:
gathering the set of current cyber security threat data from a plurality of sources of industry cyber security threats that pertain to an industry that corresponds to the organization.

10. The information handling system of claim 8 wherein the actions further comprise:
recording a set of cyber security simulation events encountered by the user based on the decisions made by the user; and
using the recorded set of cyber security simulation events in the evaluated cyber security threat.

11. The information handling system of claim 8 wherein the actions further comprise:
ingesting the set of organization information and the set of current cyber security threat data into a corpus of a question answering (QA) system;
presenting an initial decision-linked simulation segment to the user;
receiving a first of the plurality of decisions from the user based on the initial decision-linked simulation segment;
identifying and presenting a second decision-linked simulation segment from the plurality of simulation segments based on the first decision received from the user; and
repeating the receiving, identifying, and presenting of decision-linked simulation segments until an end of simulation is reached.

12. The information handling system of claim 8 wherein the actions further comprise:
providing the evaluated cyber security threat to the user, wherein the evaluated cyber security threat includes the retained route that the user took through the simulation.

13. The information handling system of claim 8 wherein the actions further comprise:
ingesting the set of organization information and the set of current cyber security threat data into a corpus of a question answering (QA) system;
presenting an initial decision-linked simulation segment to the user;
submitting a plurality of questions to the QA system, wherein each of the questions pertains to a likelihood of cyber threats to the organization based on the ingested organization information and ingested set of current cyber security threat data;
receiving a set of answers from the QA system responsive to the submitted questions; and
generating the plurality of decision-linked stimulation segments based on the set of answers received from the QA system.

14. The information handling system of claim 13 wherein a set of the plurality of questions are formulated based on a previous simulation segment corresponding to each of the respective questions included in the set of questions.

15. A computer program product stored in a computer readable storage medium, comprising computer program code that, when executed by an information handling system, performs actions comprising:
retrieving a set of organization information that pertains to a computer system operated by an organization;
retrieving a set of current cyber security threat data that pertains to the organization;
generating a security simulation based on the current cyber security threat data and the organization data, wherein the simulation comprises a plurality of decision-linked simulation segments;
performing the simulation in which a user makes a plurality of decisions based on the plurality of decision-linked simulation segments, the performing comprising:
executing a subset of the decision-linked simulation segments, the subset determined by the plurality of decisions made by the user, wherein the plurality of decisions results hi an evaluated cyber security threat corresponding to the organization's computer system; and
retaining a route of the user through the simulation, the route including an identification of the executed subset of the decision-linked simulation segments.

16. The computer program product of claim 15 wherein the actions further comprise:
gathering the set of current cyber security threat data from a plurality of sources of industry cyber security threats that pertain to an industry that corresponds to the organization.

17. The computer program product of claim 15 wherein the actions further comprise:
recording a set of cyber security simulation events encountered by the user based on the decisions made by the user; and
using the recorded set of cyber security simulation events in the evaluated cyber security threat.

18. The computer program product of claim 15 wherein the actions further comprise:
ingesting the set of organization information and the set of current cyber security threat data into a corpus of a question answering (QA) system;

presenting an initial decision-linked simulation segment to the user;

receiving a first of the plurality of decisions from the user based on the initial decision-linked simulation segment;

identifying and presenting a second decision-linked simulation segment from the plurality of simulation segments based on the first decision received from the user; and repeating the receiving, identifying, and presenting of decision-linked simulation segments until an end of simulation is reached.

19. The computer program product of claim 18 wherein the actions further comprise:

providing the evaluated cyber security threat to the user, wherein the evaluated cyber security threat includes the retained route that the user took through the simulation.

20. The computer program product of claim 15 wherein the actions further comprise:

ingesting the set of organization information and the set of current cyber security threat data into a corpus of a question answering (QA) system;

presenting an initial decision-linked simulation segment to the user;

submitting a plurality of questions to the QA system; wherein each of the questions pertains to a likelihood of cyber threats to the organization based on the ingested organization information and ingested set of current cyber security threat data and wherein the a set of the plurality of questions are formulated based on a previous simulation segment corresponding to each of the respective questions included in the set of questions;

receiving a set of answers from the QA system responsive to the submitted questions; and generating the plurality of decision-linked simulation segments based on the set of answers received from the QA system.

* * * * *